United States Patent [19]
Osawa et al.

[11] Patent Number: 5,371,150
[45] Date of Patent: Dec. 6, 1994

[54] FLUOROCARBON RUBBER COMPOSITION

[75] Inventors: Yasuhisa Osawa; Mikio Iino, both of Gunma, Japan

[73] Assignee: Shin-Etsu Chemical Co., Ltd., Tokyo, Japan

[21] Appl. No.: 87,306

[22] Filed: Jul. 8, 1993

[30] Foreign Application Priority Data

Jul. 8, 1992 [JP] Japan .................................. 4-204468

[51] Int. Cl.$^5$ ................................................ C08F 8/00
[52] U.S. Cl. .............................. 525/326.3; 525/326.2; 525/342
[58] Field of Search .................... 525/326.2, 326.3, 342

*Primary Examiner*—Edward Cain
*Attorney, Agent, or Firm*—Millen, White, Zelano, & Branigan

[57] ABSTRACT

Proposed is a polyol-crosslinkable fluorocarbon rubber-based composition which exhibits excellent workability in milling and molding as well as excellent storage stability and is capable of giving a molded and vulcanized rubber article at a high vulcanization velocity with good mold-releasability of the molded and vulcanized rubber article from the metal mold. The rubber composition comprises, as the essential ingredients: (a) a polyol-crosslinkable fluorocarbon rubber and (b) a crosslinking agent which is, in place of a conventional polyol compound such as bisphenol A, a silylated polyol compound such as 1,1,1,3,3,3-hexafluoro-2,2-bis(4-trimethylsiloxy phenyl) propane, i.e. a silylation product of bisphenol AF.

15 Claims, 2 Drawing Sheets

FIG. I
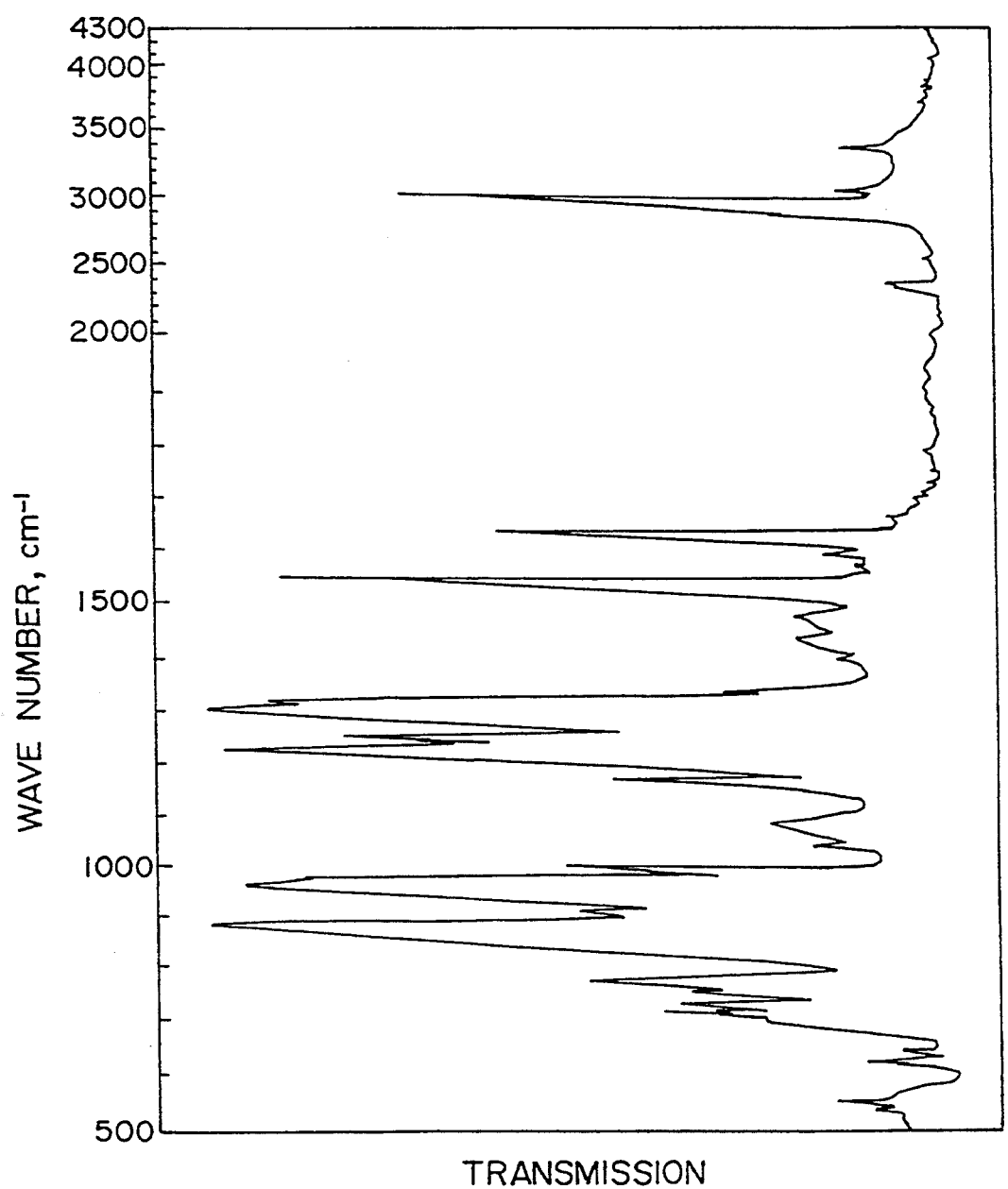

FLUOROCARBON RUBBER COMPOSITION

The present invention relates to a fluorocarbon rubber composition or, more particularly, to a polyol-crosslinkable fluorocarbon rubber composition which is excellent in the milling and molding workability and storage stability and is capable of being cured at a high curing velocity with good releasability of the cured rubber body from the metal mold in which the rubber composition is cured.

BACKGROUND OF THE INVENTION

As is well known, fluorocarbon rubbers in general have excellent properties such as heat resistance against chemical and mechanical strengths so that they are industrially used in a variety of fields including the industries of automobiles and machinery. A problem in the industrial application of fluorocarbon rubbers is that the workability thereof in the milling and molding behavior and releasability from metal molds is relatively poor as compared with other rubbers, not to mention the expensiveness of fluorocarbon rubbers in general.

In addition to the expensiveness of a fluorocarbon rubber per se, shaped and vulcanized articles of a fluorocarbon rubber are expensive as a consequence of the very high costs for the preparation of vulcanized articles from the rubber composition. For example, fluorocarbon rubbers generally have poor milling workability so that an unduly long time is taken for the roll milling work. The molding and vulcanizing works of the fluorocarbon rubber composition must be performed at a relatively high temperature taking a long time. Further, a secondary vulcanization treatment at a high temperature taking a long time is indispensable in order that the shaped and vulcanized rubber articles can exhibit fully stabilized properties. This is the reason for the limited industrial application fields of fluorocarbon rubbers as compared with other elastomers.

Various attempts have of course been undertaken heretofore for the improvement of the workability of fluorocarbon rubbers. For example, Japanese Patent Kokai 3-22308 proposes a method in which a fluorocarbon rubber is compounded with a silicone-based additive having a siloxane linkage so as to impart the fluorocarbon rubber composition with improved workability in roll milling and releasability from metal molds in molding. This method, however, has several problems and disadvantages. For example, troubles are sometimes caused by the bleeding of the silicone-based additive on the surface of the rubber articles as molded due to the limited miscibility of the silicone-based additive compound with the fluorocarbon rubber along with a problem in respect of the storage stability of the composition. Furthermore, a decrease is caused in the mechanical properties of the shaped and vulcanized rubber articles as a consequence of the admixture of a silicone-based additive. Japanese Patent Kokai 60-101135, on the other hand, proposes that a fluorocarbon rubber is blended with other synthetic rubbers or resins with an object to decrease the cost of the rubber composition. Only very few cases have been successful in the industrialization of this method because the rubber articles prepared in this way are poor in properties as compared with those obtained from a fluorocarbon rubber, as such, for the same reasons as in the case of the silicone-based additives.

As to the polyol-crosslinkable fluorocarbon rubber, which is a copolymer of, for example, vinylidene fluoride and hexafluoropropylene crosslinkable with a polyol compound such as bisphenol A, among various types of fluorocarbon rubbers, in particular, a proposal has been made in Japanese Patent Kokai 58-111848 that a polyol-crosslinkable fluorocarbon rubber is stored under a hermetically sealed condition and processing thereof is undertaken in the presence of a drying agent or under dry heating with pressure reduction because the crosslinking reaction of the rubber gradually proceeds in contact with moisture-containing air during storage and processing resulting in a decrease in the properties of the vulcanized rubber article. Alternatively, a solution composition of a polyol-crosslinkable fluorocarbon rubber is proposed by dissolving the rubber in an organic solvent. Although the rubber molecules can be shielded from the atmospheric moisture by the solvent, the crosslinking reaction of the rubber molecules proceeds gradually even by reacting with a trace amount of water contained in the organic solvent finally resulting in gelation of the solution unless a special means is undertaken in order to decrease the water content in the solvent as completely as possible so that the pot life of the working solution can be extended. At any rate, no very effective method is known for the improvement of the storage stability of a polyol-crosslinkable fluorocarbon rubber.

SUMMARY OF THE INVENTION

The present invention accordingly has an object to provide a polyol-crosslinkable fluorocarbon rubber-based composition having excellent workability in processing and storage stability by solving the above described problems in the conventional fluorocarbon rubber-based compositions of the polyol-crosslinkable type.

Thus, the polyol-crosslinkable fluorocarbon rubber-based composition of the present invention comprises, as a uniform blend:

(a) 100 parts by weight of a polyol-crosslinkable fluorocarbon rubber; and
(b) from 0.1 to 10 parts by weight of a silylated polyol compound as a crosslinking agent.

BRIEF DESCRIPTION OF THE DRAWING

FIG. 1 is an infrared absorption spectrum of the silylated polyol compound as the crosslinking agent used in the present invention.

DETAILED DESCRIPTION OF THE PREFERRED EMBODIMENTS

Figure 2A:
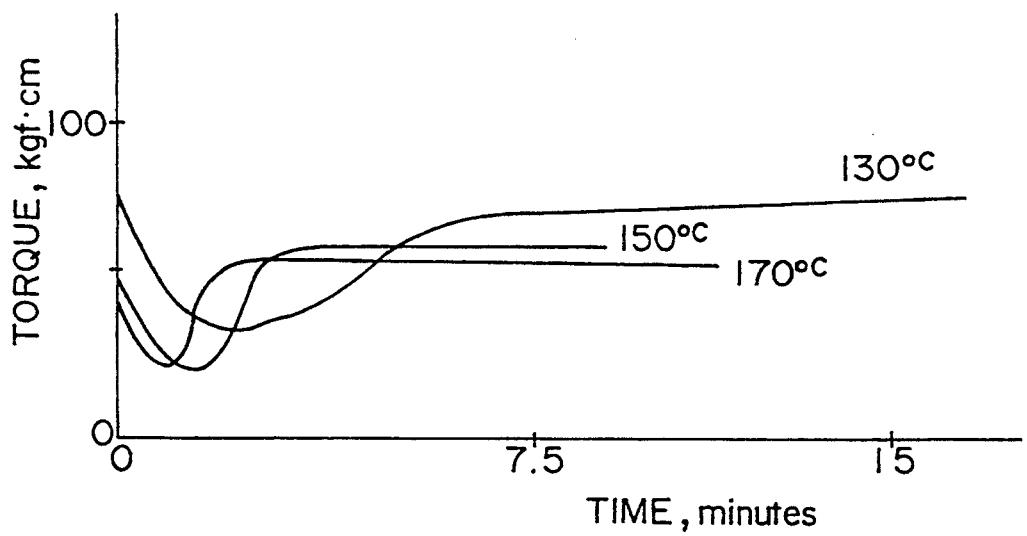
FIGS. 2a and 2b are each a graph showing the results of the vulcanization test of the rubber compositions obtained in Example 1 and Comparative Example 1, respectively.

As is described above, the essential ingredients in the inventive polyol-crosslinkable fluorocarbon rubber composition include the components (a) and (b), of which the characteristic ingredient is the silylated polyol compound as a crosslinking agent that is component (b), by virtue of which a quite unexpected advantage can be obtained in that the time required for the vulcanization of the rubber composition can be greatly decreased. Additionally, there is an advantage that the rubber composition can be imparted with improved workability in roll milling and releasability from a metal mold as well as with improved storage stability.

The principal ingredient in the inventive rubber composition in the component (a) which is a polyol-crosslinkable fluorocarbon rubber or, namely, an elastic copolymer of highly fluorinated ethylenically unsaturated monomer. Examples of such a fluorocarbon rubber include elastic copolymers of vinylidene fluoride and hexafluoropropylene, optionally, in combination with other fluorinated monomers such as pentafluoropropylene, trifluoroethylene, trifluorochloroethylene, tetrafluoroethylene, vinyl fluoride, perfluoro(methyl vinyl ether), perfluoro(propyl vinyl ether) and the like, of which binary elastic copolymers of vinylidene fluoride and hexafluoropropylene and ternary elastic copolymers of vinylidene fluoride, tetrafluoroethylene and hexafluoropropylene are preferred.

It is conventional that a polyol-crosslinkable fluorocarbon rubber-based composition is compounded with an acid acceptor which includes compounds of an alkali metal or an alkaline earth metal such as magnesium oxide, calcium oxide, calcium hydroxide, barium stearate and sodium stearate as well as lead oxide. The amount of the acid acceptor in the inventive rubber composition, when added, is in the range from 1 to 20 parts by weight per 100 parts by weight of the polyol-crosslinkable fluorocarbon rubber as the component (a).

It is also conventional that a polyol-crosslinkable fluorocarbon rubber-based composition is compounded with a catalyst which serves to promote the crosslinking reaction and is exemplified by onium salts, i.e. a quaternary ammonium or phosphonium halide represented by the general formula $[R_4X]^+Y^-$ in which R is a monovalent hydrocarbon group, X is an atom of nitrogen or phosphorus and Y is a halogen atom, and an iminium salt represented by the general formula $[R_3P=N=PR_3]^+Y^-$, in which R and Y each have the same meaning as defined above. Preferable onium salts include benzyl triphenyl phosphonium chloride and bromide and preferable iminium salts include bis(benzyl phenyl phosphine) iminium chloride. The amount of the catalyst in the inventive rubber composition, when added, is in the range from 0.1 to 10 parts by weight or, preferably, from 0.2 to 3 parts by weight per 100 parts by weight of the polyol-crosslinkable fluorocarbon rubber as the component (a).

The component (b) as the most characteristic ingredient in the inventive rubber composition is a silylated polyol crosslinking agent which is a polyol compound of which at least one of the hydroxy groups is silylated. Suitable polyol compounds include aromatic polyhydroxy compounds and fluorinated aliphatic polyhydroxy compounds. Examples of the polyol compound of the former class include bisphenol A, bisphenol B, bisphenol AF, 1,3,5-trihydroxy benzene, hydroxy resorcine, 2-tert-butyl hydroquinone, 2-methyl resorcine, 1,5-dihydroxy naphthalene, 2,7-dihydroxy naphthalene, 2,2-bis(4-hydroxyphenyl) butane, 3,3',5,5'-tetrachloro bisphenol A, 4,4'-dihydroxy diphenyl and the like. Examples of the polyol compound of the latter class include those expressed by the structural formulas $CF_2(CF_2CH_2OH)_2$, $HOCH_2(CF_2)_4OCF(CF_3)CH_2OH$, $CF_2(CFHCF_2CH_2OH)_2$, $(CF_2)_3(CF_2CH_2OH)_2$ and the like. Preferable ones among them are bisphenol A, bisphenol B, bisphenol AF, i.e. 1,1,1,3,3,3-hexafluoro-2,2bis(4-hydroxyphenyl) propane, hydroquinone and the like. The silylated compound of bisphenol A, e.g., 1,1,1,3,3,3-hexafluoro-2,2-bis(4-trimethylsiloxyphenyl) propane, is a novel compound not known in the prior art nor described in any literatures.

The silylating agent which reacts with the above described polyol compound to form a silylated polyol crosslinking agent as the component (b) is represented by the general formula $R^1_3Si-Z$, in which $R^1$ is, each independently from the others, an organic group or a silicon-containing organic group having no reactivity with the hydroxy group in the polyol compound exemplified by unsubstituted or substituted monovalent hydrocarbon groups such as alkyl groups, e.g., methyl, ethyl, propyl, isobutyl and tert-butyl groups, aryl groups, e.g., phenyl group, and alkenyl groups, e.g., vinyl group, as well as 3,3,3-trifluoropropyl group and the like obtained by replacing a part or all of the hydrogen atoms in the above named unsubstituted hydrocarbon groups with halogen atoms and triorganosiloxy groups such as trimethyl siloxy, dimethyl phenyl siloxy and dimethyl vinyl siloxy groups, of which methyl, ethyl, phenyl and 3,3,3-trifluoropropyl groups are preferred, and Z is a functional group capable of reacting with the hydroxy group in the polyol compound such as hydrogen atom, chlorine atom, hydroxy group and unsubstituted or substituted amino group of the general formula $-NHR^2$, $R^2$ being a hydrogen atom or an organic group or a silicon-containing organic group which can be the same as $R^1$ exemplified above.

A particularly preferable silylating agent in respect of the reactivity with the hydroxy groups in the polyol compound is hexamethyl disilazane which can readily react even at room temperature with the polyol compound to convert the hydroxy group into a trimethyl siloxy group.

In conducting the silylation reaction of the polyol compound with the above described silylating agent, it is preferable that all of the hydroxy groups in the starting polyol compound are silylated although any partial silylation products of the polyol compound, of which at least one of the hydroxy groups is silylated, can be used as the component (b) in the inventive fluorocarbon rubber-based composition.

The amount of the silylated polyol compound as the crosslinking agent, i.e. the component (b), in the inventive fluorocarbon rubber-based composition is in the range from 0.1 to 10 parts by weight or, preferably, from 0.5 to 5 parts by weight per 100 parts by weight of the polyol-crosslinkable fluorocarbon rubber as the component (a). When the amount of the crosslinking agent is too small, the rubber article obtained by the vulcanization of the rubber composition has only poor mechanical properties while, even when the amount thereof is increased to exceed the above mentioned upper limit, no particular further improvement can be obtained in the properties of the vulcanized rubber articles.

The fluorocarbon rubber-based composition of the present invention can be obtained by mixing the above described polyol-crosslinkable fluorocarbon rubber, acid acceptor, catalyst and silylated polyol crosslinking agent each in a specified amount and kneading them together uniformly. This compounding work of these components and other optional ingredients mentioned below can be performed by using a conventional rubber processing machine such as two-roller mills for rubber processing, pressurizable kneaders, kneaders, Banbury mixers and the like without particular limitations depending on the particular formulation of the composition to achieve uniform compounding.

It is optional according to need that the polyol-crosslinkable fluorocarbon rubber-based composition of the present invention is further admixed with various kinds of known additives such as fillers, plasticizers, coloring agents and the like each in a limited amount. Examples of suitable fillers include silica fillers, carbon black, alumina, iron oxide, clay, calcium carbonate, titanium dioxide, powders of polytetrafluoroethylene resins, various kinds of electroconductive fillers, various kinds of thermal conductivity-improving fillers and so on. When a reinforcing effect of the rubber composition is desired, finely divided silica fillers and carbon blacks are preferred, of which MT carbon black is particularly preferable. These fillers can optionally be surface-treated with a silane-based or titanate ester-based surface-treatment agent.

It is further optional that the fluorocarbon rubber-based composition of the invention is prepared in a liquid form by dissolving or dispersing the above described various ingredients in a suitable organic solvent, including ketone solvents and alcohol solvents such as acetone, methyl ethyl ketone, methyl isobutyl ketone, methyl alcohol, ethyl alcohol and the like, which can be used either singly or as a combination of two kinds or more according to need. The amount of the organic solvent naturally depends on the intended application of the liquid-form rubber composition but it is usually in the range from 1 to 20 parts by weight per part by weight of the rubber composition excepting the solvent to give a liquid composition having a viscosity in the range from 10 to 100,000 centistokes at 25° C. suitable for the coating work. A liquid-form rubber composition with admixture of an organic solvent is also very stable with good pot life and storage stability.

When the rubber composition is compounded with a filler, the amount of the filler is usually 50 parts by weight or smaller per 100 parts by weight of the polyol-crosslinkable fluorocarbon rubber as the component (a). If necessary, the rubber composition of the invention can be admixed with a plasticizer such as fluorocarbon-invention oils and greases and fatty acid esters although no plasticizer is usually required since the specific silylated polyol compound as the component (b) has a plasticizing effect to improve the workability of the composition.

In the following, the polyol-crosslinkable fluorocarbon rubber-based composition of the invention is illustrated in more detail by way of examples and comparative examples, in which the term of "parts" always refers to "parts by weight", as preceded by the description of the synthetic preparation of a silylated polyol compound.

Synthetic Example: Preparation of a silylated polyol compound

Into a reaction vessel having a separable cover were introduced 336 g (1 mole) of bisphenol AF and 500 g of toluene to form a mixture into which 193 g (1.2 moles) of hexamethyl disilazane were added dropwise at 25° C. and the reaction mixture was agitated at the same temperature for 3 hours to effect the silylation reaction. Evolution of ammonia gas noted as the silylation reaction started with a slight temperature increase of the reaction mixture.

After completion of the reaction in the above described manner, the reaction mixture was freed from toluene as the solvent and unreacted hexamethyl disilazane under reduced pressure to leave 446 g of a white crystalline product, which was analyzed by the infrared absorption spectrophotometry and nuclear magnetic resonance spectrometry and identified as a silylated bisphenol AF as a product of the reaction occurred according to the reaction equation given below. FIG. 1 shows an FT-IR chart of this product. The above mentioned yield of the product was 93% of the theoretical value.

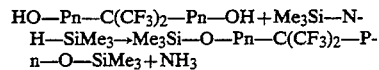

In the above given equation Me and Pn denote a methyl group and a 1,4-phenylene group, respectively. This silylated bisphenol AF had a melting point of 52° C.

EXAMPLE 1

A polyol-crosslinkable fluorocarbon rubber composition was prepared by uniformly blending and kneading, on a two-roller mill, 100 parts of a binary copolymer of vinylidene fluoride and hexafluoropropylene as a polyol-crosslinkable fluorocarbon rubber (G801, a product by Daikin Co.), 3 parts of a magnesium oxide powder (Kyomag 150, a product by Kyowa Chemical Co.) and 6 parts of a calcium hydroxide powder (reagent grade, a product by Kanto Chemical Co.) each as an acid acceptor, 0.5 part by weight of benzyl triphenyl phosphonium chloride (reagent grade, a product by Kanto Chemical Co.) as a catalyst, 2.8 parts of the silylated bisphenol AF obtained in Synthetic Example described above as a crosslinking agent and 10 parts of a MT carbon black (Thermax MT, a product by Haber Co.). The milling workability of the composition was excellent and easily gave a uniform rubber composition within 20 minutes.

The thus prepared rubber composition was subjected to a vulcanization test at 130° C. by using a vulcanization testing machine (Oscillating Disc Rheometer, manufactured by Toyo Seiki Seisakusho) to give the result shown in FIG. 2a by the three curves for the values of the torque obtained by the measurements at 130° C., 150° C. and 170° C. as a function of the vulcanization time in minutes.

The above prepared polyol-crosslinkable fluorocarbon rubber-based composition was molded and vulcanized by heating at 170° C. for 10 minutes in metal molds under a pressure of 100 kgf/cm² to give vulcanized rubber articles in the form of a sheet having a thickness of 2 mm and of a P240 ring specified in JIS B 2401 to find that the mold-releasability of the composition as vulcanized was satisfactorily good. The thus shaped rubber articles were subjected to a secondary vulcanization treatment at 230° C. for 24 hours to give finished rubber articles of which various mechanical properties were measured to give the results shown in Table 1 below.

The rubber composition before vulcanization could be dissolved or dispersed in acetone in a 3 times by weight amount to give a liquid composition which could be used as a fluorocarbon rubber-based coating composition having stability at room temperature for at least 20 hours without gelation retaining flowability. A test panel of aluminum was coated with this rubber-based liquid composition by dipping therein and pulling up therefrom and air-dried at room temperature for 3 hours followed by a heat treatment at 200° C. for 30 minutes to effect vulcanization of the coating layer so that a fluorocarbon rubber-coated test panel having excellent appearance was obtained.

EXAMPLE 2

The experimental procedure was substantially the same as in Example 1 excepting replacement of the binary-copolymeric fluorocarbon rubber G801 with the same amount of a ternary copolymer of vinylidene fluoride, tetrafluoroethylene and hexafluoropropylene (G902, a product by Daikin Co.). A uniform rubber composition could be obtained within 20 minutes of the milling time on a two-roller mill. Table 1 also shows the mechanical properties of the fully vulcanized rubber articles prepared from this rubber composition. The mold-releasability of the composition after vulcanization was as good as in Example 1. The pot life of the rubber-based liquid composition in acetone was 12 hours.

EXAMPLE 3

The experimental procedure was substantially the same as in Example 1 except that the amount of the MT carbon black was increased to 30 parts by weight. In this case, the length of time taken for the roll milling work was extended to 25 minutes due to the high loading of the carbon black. The mold releasability of the composition after vulcanization was as good as in Example 1. Table 1 also gives the mechanical properties of the fully vulcanized rubber articles prepared from this rubber composition. The pot life of the rubber-based liquid composition in acetone was 12 hours.

Comparative Example 1

Figure 2B:
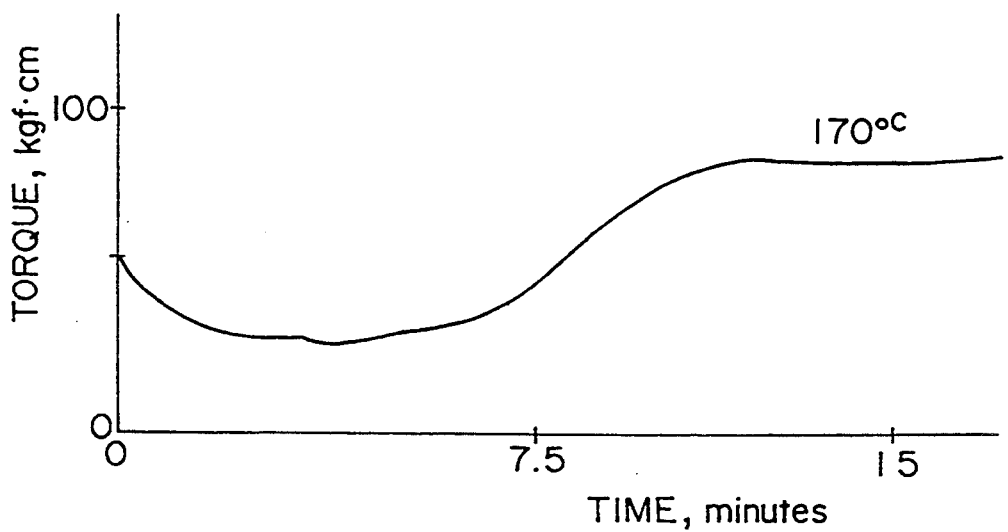

The experimental procedure was substantially the same as in Example 1 excepting replacement of 2.8 parts of the silylated bisphenol AF with 2.0 parts of bisphenol AF before silylation. The length of time taken for the roll milling work of the composition was 30 minutes and the mold-releasability of the composition after vulcanization was somewhat poor as compared with Examples 1 to 3 to cause troubles unless the surface of the metal mold was treated beforehand with a mold-release agent. The pot life of the rubber-based liquid composition in acetone was 6 hours. The mechanical properties of the fully vulcanized rubber articles prepared from this composition are shown in Table 1. The pot life of the rubber-based liquid composition in acetone was 6 hours. Further, the rubber composition was subjected to the vulcanization test in the same manner as in Example 1 at 170° C. to give the result shown in FIG. 2b.

Comparative Example 2

The experimental procedure was substantially the same as in Example 1 except that the amount of the silylated bisphenol AF as the crosslinking agent was decreased to 0.05 part. The workability of the rubber composition in the roll milling work was poor and the rubber composition could not be fully vulcanized by the same vulcanization procedure as in Example 1 only to give foamed rubber articles which were not suitable for the measurements of the mechanical properties. The mold-releasability of the rubber composition after vulcanization was very poor so that molding in a metal mold could not be performed unless the surface of the metal mold was treated beforehand with a mold-release agent.

Comparative Example 3

The experimental procedure was substantially the same as in Example 1 except that the amount of the silylated bisphenol AF was increased from 2.8 parts to 15 parts and the amount of the catalyst compound was increased from 0.5 part to 3.0 parts. Although the workability of the rubber composition in roll milling was within an acceptable range and the mold-releasability of the composition after vulcanization was good, the fully vulcanized rubber articles were poor in respect of the rubbery elasticity or the value of the ultimate elongation as is shown in Table 1 together with other mechanical properties.

TABLE 1

| | Example | | | Comparative Example | |
|---|---|---|---|---|---|
| | 1 | 2 | 3 | 1 | 3 |
| Hardness, Hs | 61 | 63 | 77 | 65 | 99 |
| Ultimate elongation, % | 394 | 399 | 383 | 311 | 70 |
| Tensile strength, kgf/cm$^2$ | 114 | 133 | 122 | 117 | 218 |
| Tear strength, kgf/cm | 22 | 21 | 37 | 20 | 50 |
| Permanent compression set, %, after 70 hours at | | | | | |
| 150° C. | 14 | 15 | 17 | 15 | — |
| 200° C. | 28 | 30 | 35 | 33 | — |

What is claimed is:

1. A polyol-crosslinkable fluorocarbon rubber-based composition which comprises, as a uniform blend:
   (a) 100 parts by weight of a polyol-crosslinkable fluorocarbon rubber; and
   (b) from 0.1 to 10 parts by weight of a silylated polyol compound as a crosslinking agent of the component (a).

2. The polyol-crosslinkable fluorocarbon rubber-based composition as claimed in claim 1 in which the polyol-crosslinkable fluorocarbon rubber is an elastic copolymer of a combination of fluorocarbon monomers comprising vinylidene fluoride and hexafluoropropylene.

3. The polyol-crosslinkable fluorocarbon rubber-based composition as claimed in claim 2 in which the polyol-crosslinkable fluorocarbon rubber is an elastic binary copolymer of vinylidene fluoride and hexafluoropropylene or an elastic ternary copolymer of vinylidene fluoride, tetrafluoroethylene and hexafluoropropylene.

4. The polyol-crosslinkable fluorocarbon rubber-based composition as claimed in claim 1 which further comprises an acid acceptor.

5. The polyol-crosslinkable fluorocarbon rubber-based composition as claimed in claim 4 in which the acid acceptor is selected from the group consisting of magnesium oxide, calcium oxide, lead oxide, calcium hydroxide, barium stearate and sodium stearate.

6. The polyol-crosslinkable fluorocarbon rubber-based composition as claimed in claim 1 which further comprises a catalyst.

7. The polyol-crosslinkable fluorocarbon rubber-based composition as claimed in claim 6 in which the catalyst is selected from the group consisting of onium salts and iminium salts.

8. The polyol-crosslinkable fluorocarbon rubber-based composition as claimed in claim 7 in which the onium salt is benzyl triphenyl phosphonium chloride or benzyl triphenyl phosphonium bromide.

9. The polyol-crosslinkable fluorocarbon rubber-based composition as claimed in claim 7 in which the iminium salt is bis(benzyl phenyl phosphine) iminium chloride.

10. The polyol-crosslinkable fluorocarbon rubber-based composition as claimed in claim 1 in which the silylated polyol compound is a silylation product of a polyol compound selected from aromatic polyhydroxy compounds and fluorinated aliphatic polyhydroxy compounds with a silylating agent.

11. The polyol-crosslinkable fluorocarbon rubber-based composition as claimed in claim 10 in which the aromatic polyol compound is selected from the group consisting of bisphenol A, bisphenol B, bisphenol AF and hydroquinone.

12. The polyol-crosslinkable fluorocarbon rubber-based composition as claimed in claim 10 in which the silylating agent is hexamethyl disilazane.

13. The polyol-crosslinkable fluorocarbon rubber-based composition of claim 4, wherein the acid acceptor is in the composition in an amount of 1 to 20 parts by weight per 100 parts by weight of the polyol-crosslinkable fluorocarbon rubber, (a).

14. The polyol-crosslinkable fluorocarbon rubber-based composition of claim 6, wherein the catalyst is in the composition in an amount of 0.1 to 10 parts by weight per 100 parts by weight of the polyol-crosslinkable fluorocarbon rubber, (a).

15. The polyol-crosslinkable fluorocarbon rubber-based composition of claim 6, wherein the silylated polyol compound (b) is in the composition in an amount of 0.5 to 5 parts by weight per 100 parts by weight of the polyol-crosslinkable fluorocarbon rubber, (a).

* * * * *